United States Patent
Yahagi

(10) Patent No.: US 7,848,630 B2
(45) Date of Patent: Dec. 7, 2010

(54) AUTOFOCUS ADAPTER

(75) Inventor: Satoshi Yahagi, Saitama (JP)

(73) Assignee: Fujinon Corporation, Saitama (JP)

( * ) Notice: Subject to any disclaimer, the term of this patent is extended or adjusted under 35 U.S.C. 154(b) by 591 days.

(21) Appl. No.: 11/730,376

(22) Filed: Mar. 30, 2007

(65) Prior Publication Data

US 2007/0230935 A1      Oct. 4, 2007

(30) Foreign Application Priority Data

Mar. 30, 2006    (JP)  ............................ P2006-094539

(51) Int. Cl.
*G03B 7/28* (2006.01)

(52) U.S. Cl. ...................... 396/111; 396/71; 396/530; 396/544; 348/350; 348/375

(58) Field of Classification Search ................. 396/111, 396/71, 530, 544, 545; 359/625, 782, 685, 359/781, 366, 672; 348/340, 360, 350, 351
See application file for complete search history.

(56) References Cited

U.S. PATENT DOCUMENTS

| | | | | |
|---|---|---|---|---|
| 4,168,897 | A * | 9/1979 | Gates | 396/25 |
| 4,529,286 | A * | 7/1985 | Fujii | 396/111 |
| 4,694,151 | A * | 9/1987 | Yoshimura | 250/201.2 |
| 4,842,395 | A * | 6/1989 | Sato et al. | 359/380 |
| 5,499,069 | A * | 3/1996 | Griffith | 396/71 |
| 6,157,781 | A * | 12/2000 | Konno et al. | 396/71 |
| 6,208,473 | B1 * | 3/2001 | Omura | 359/727 |
| 6,597,872 | B2 * | 7/2003 | Masuda | 396/382 |
| 6,924,842 | B2 * | 8/2005 | Yahagi | 348/360 |
| 7,193,786 | B2 * | 3/2007 | Arimoto et al. | 359/682 |
| 7,233,358 | B2 * | 6/2007 | Yoshikawa | 348/340 |
| 2006/0285079 | A1 * | 12/2006 | Wada | 353/46 |

FOREIGN PATENT DOCUMENTS

| | | | |
|---|---|---|---|
| JP | 2002-296492 A | | 10/2002 |
| JP | 2002-365517 A | | 12/2002 |
| JP | 2003-248164 A | | 9/2003 |
| JP | 2003-270517 A | | 9/2003 |
| JP | 2007121748 A | * | 5/2007 |

OTHER PUBLICATIONS machine translation of JP2007-121748A.*

* cited by examiner

*Primary Examiner*—Rodney E Fuller
*Assistant Examiner*—Linda B Smith
(74) *Attorney, Agent, or Firm*—Birch, Stewart, Kolasch & Birch, LLP

(57) ABSTRACT

An autofocus adapter is provided and includes an imaging adapter optical system placed on an optical axis of an imaging lens when the autofocus adapter is attached, and a focus state detection adapter optical system placed on an optical axis different from the optical axis of the imaging lens when the autofocus adapter is attached. The imaging adapter optical system has a light split prism for splitting subject light passing through the imaging lens into imaging subject light and the focus state detection subject light, a first lens group having a negative power as a whole and placed on the object side with respect to the light split prism, and a second lens group having a positive power as a whole and placed on the image side with respect to the light split prism. The focus state detection adapter optical system has a positive lens group having the same lens configuration as the second lens group in the imaging adapter optical system.

8 Claims, 10 Drawing Sheets

FIG. 7

| \multicolumn{5}{c}{LENS DATA (IMAGING LENS)} |||||
|---|---|---|---|---|
| Si (SURFACE NUMBER) | Ri (CURVATURE RADIUS) | Di (SPACING) | Ndj (REFRACTIVE INDEX) | vdj (ABBE NUMBER) |
| 1 | −236.017 | 2.40 | 1.80517 | 25.4 |
| 2 | 119.117 | 11.69 | 1.49700 | 81.5 |
| 3 | −181.987 | 0.12 | | |
| 4 | 140.405 | 8.42 | 1.43387 | 95.1 |
| 5 | −280.674 | 7.06 | | |
| 6 | 109.282 | 5.77 | 1.64000 | 60.1 |
| 7 | 566.046 | 0.12 | | |
| 8 | 66.710 | 5.73 | 1.80609 | 33.3 |
| 9 | 144.408 | 0.91 | | |
| 10 | 66.981 | 0.82 | 1.83480 | 42.7 |
| 11 | 13.228 | 6.11 | | |
| 12 | −42.197 | 0.82 | 1.83480 | 42.7 |
| 13 | 40.333 | 0.50 | | |
| 14 | 25.161 | 5.05 | 1.84660 | 23.9 |
| 15 | −32.694 | 0.57 | | |
| 16 | −25.361 | 0.82 | 1.83480 | 42.7 |
| 17 | 232.664 | 54.26 | | |
| 18 | −29.223 | 0.82 | 1.78800 | 47.3 |
| 19 | 43.383 | 2.86 | 1.84660 | 23.9 |
| 20 | −370.235 | 4.00 | | |
| 21 | (APERTURE DIAPHRAGM) | 1.98 | | |
| 22 | −693.145 | 3.79 | 1.58144 | 40.7 |
| 23 | −38.063 | 0.12 | | |
| 24 | 63.283 | 5.12 | 1.51823 | 58.9 |
| 25 | −99.685 | 0.12 | | |
| 26 | 43.975 | 7.80 | 1.51633 | 64.1 |
| 27 | −38.311 | 1.30 | 1.83480 | 42.7 |
| 28 | 126.870 | 15.49 | | |
| 29 | 37.766 | 7.57 | 1.51823 | 58.9 |
| 30 | −47.763 | 0.12 | | |
| 31 | 1353.555 | 5.24 | 1.51741 | 52.4 |
| 32 | −33.534 | 1.30 | 1.83400 | 37.1 |
| 33 | 26.449 | 2.72 | | |
| 34 | 43.178 | 8.01 | 1.51633 | 64.1 |
| 35 | −19.497 | 1.30 | 1.83400 | 37.1 |
| 36 | −45.125 | 2.17 | | |
| 37 | 50.340 | 5.56 | 1.51633 | 64.1 |
| 38 | −45.493 | | | |

FIG. 8

| | LENS DATA (ADAPTER OPTICAL SYSTEM) • EXAMPLE 1 | | | |
|---|---|---|---|---|
| Si (SURFACE NUMBER) | Ri (CURVATURE RADIUS) | Di (SPACING) | Ndj (REFRACT-IVE INDEX) | vdj (ABBE NUMBER) |
| L1 { 1 | 292.539 | 2.00 | 1.83400 | 37.1 |
| 2 | 29.443 | 2.97 | | |
| 3 | -439.030 | 2.00 | 1.88299 | 40.7 |
| 4 | 31.802 | 3.67 | 1.80809 | 22.8 |
| 5 | 965.509 | 1.00 | | |
| P1 { 6 | ∞ | 26.00 | 1.80809 | 22.8 |
| 7 | ∞ | 1.00 | | |
| L2 { 8 | 50.333 | 3.77 | 1.83480 | 42.7 |
| 9 | -103.206 | 0.75 | | |
| 10 | 72.541 | 1.21 | 1.51823 | 58.9 |
| 11 | 47.027 | 0.12 | | |
| 12 | 28.881 | 5.14 | 1.53171 | 48.8 |
| 13 | -126.944 | 2.00 | 1.80517 | 25.4 |
| 14 | 43.811 | 5.00 | | |
| 31P { 15 | ∞ | 33.00 | 1.58266 | 46.4 |
| 16 | ∞ | 13.20 | 1.51633 | 64.0 |
| 17 | ∞ | | | |

FIG. 9

| | LENS DATA (ADAPTER OPTICAL SYSTEM) • EXAMPLE 2 | | | |
|---|---|---|---|---|
| Si (SURFACE NUMBER) | Ri (CURVATURE RADIUS) | Di (SPACING) | Ndj (REFRACT-IVE INDEX) | vdj (ABBE NUMBER) |
| L1 { 1 | 792.103 | 1.51 | 1.81600 | 46.6 |
| 2 | 28.719 | 1.86 | | |
| 3 | 105.563 | 1.50 | 1.88299 | 40.7 |
| 4 | 34.898 | 2.82 | 1.80809 | 22.8 |
| 5 | 85.793 | 1.00 | | |
| P1 { 6 | ∞ | 26.00 | 1.80809 | 22.8 |
| 7 | ∞ | 1.00 | | |
| L2 { 8 | 49.690 | 3.75 | 1.83480 | 42.7 |
| 9 | -110.533 | 0.21 | | |
| 10 | 28.017 | 3.75 | 1.51633 | 64.1 |
| 11 | 61.797 | 1.50 | 1.80809 | 22.8 |
| 12 | 30.629 | 5.00 | | |
| 31P { 13 | ∞ | 33.00 | 1.60859 | 46.4 |
| 14 | ∞ | 13.20 | 1.51633 | 64.0 |
| 15 | ∞ | | | |

FIG. 10

| | LENS DATA (ADAPTER OPTICAL SYSTEM) • EXAMPLE 3 | | | |
|---|---|---|---|---|
| Si (SURFACE NUMBER) | Ri (CURVATURE RADIUS) | Di (SPACING) | Ndj (REFRACTIVE INDEX) | vdj (ABBE NUMBER) |
| L1 — 1 | 136.031 | 1.46 | 1.81600 | 46.6 |
| 2 | 34.248 | 2.21 | | |
| 3 | 626.534 | 1.47 | 1.88299 | 40.7 |
| 4 | 30.199 | 3.31 | 1.80809 | 22.8 |
| 5 | 89.026 | 1.00 | | |
| P1 — 6 | ∞ | 26.00 | 1.80809 | 22.8 |
| 7 | ∞ | 1.00 | | |
| L2 — 8 | 106.570 | 2.54 | 1.83480 | 42.7 |
| 9 | −169.824 | 0.25 | | |
| 10 | 26.531 | 4.91 | 1.51633 | 64.1 |
| 11 | 194.929 | 1.46 | 1.80809 | 22.8 |
| 12 | 59.373 | 5.00 | | |
| 31P — 13 | ∞ | 33.00 | 1.60859 | 46.4 |
| 14 | ∞ | 13.20 | 1.51633 | 64.0 |
| 15 | ∞ | | | |

FIG. 11

| | LENS DATA (ADAPTER OPTICAL SYSTEM) • EXAMPLE 4 | | | |
|---|---|---|---|---|
| Si (SURFACE NUMBER) | Ri (CURVATURE RADIUS) | Di (SPACING) | Ndj (REFRACTIVE INDEX) | vdj (ABBE NUMBER) |
| L1 — 1 | 249.514 | 1.50 | 1.81600 | 46.6 |
| 2 | 30.930 | 2.19 | | |
| 3 | 242.098 | 1.50 | 1.88299 | 40.7 |
| 4 | 33.183 | 3.19 | 1.80809 | 22.8 |
| 5 | 110.086 | 1.00 | | |
| P1 — 6 | ∞ | 26.00 | 1.80809 | 22.8 |
| 7 | ∞ | 1.00 | | |
| L2 — 8 | 47.753 | 3.47 | 1.83480 | 42.7 |
| 9 | −201.521 | 0.20 | | |
| 10 | 30.105 | 4.14 | 1.51633 | 64.1 |
| 11 | 128.474 | 1.50 | 1.84665 | 23.8 |
| 12 | 39.690 | 5.00 | | |
| 31P — 13 | ∞ | 33.00 | 1.60859 | 46.4 |
| 14 | ∞ | 13.20 | 1.51633 | 64.0 |
| 15 | ∞ | | | |

FIG. 12

|  | f1 | f2 | CONDITIONAL EXPRESSION (2) f1/f2 | β | 2h | CONDITIONAL EXPRESSION (1) d/2h |
|---|---|---|---|---|---|---|
| EXAMPLE 1 | −32.06 | 44.53 | −0.72 | 1.364 | 25.27 | 1.03 |
| EXAMPLE 2 | −31.96 | 41.15 | −0.78 | 1.250 | 25.46 | 1.02 |
| EXAMPLE 3 | −34.80 | 46.27 | −0.75 | 1.328 | 25.65 | 1.01 |
| EXAMPLE 4 | −33.58 | 44.18 | −0.76 | 1.300 | 25.50 | 1.02 |

AUTOFOCUS ADAPTER

BACKGROUND OF THE INVENTION

1. Field of the Invention

This invention relates to an autofocus adapter that can be applied to focus detection in autofocus control of an imaging lens.

2. Description of Related Art

An autofocus system in a home-use video camera, etc., generally is based on a contrast system. This contrast system integrates high-frequency components of video signals in one range (focus area) of the video signals obtained from an imaging device (luminance signals) to find a focus evaluation value and automatically makes focus adjustment so that the focus evaluation value becomes the maximum. Accordingly, the best focus for allowing the sharpness (contrast) of an image captured by the imaging device to become the maximum is obtained.

However, the contrast system is a so-called hill-climbing system for finding the best focus while moving a focusing lens and thus has a disadvantage of a reaction rate to focusing. Then, to eliminate the disadvantage of the contrast system, a method of detecting the focus state of an imaging lens using a plurality of imaging devices placed at positions different in the optical path length is proposed. (Refer to JP-A-2002-296492, JP-A-2002-365517, JP-A-2003-248164 and JP-A-2003-270517.) In the detection method, an imaging device for focus state detection is disposed at three positions of a conjugate position relative to a usual imaging device for image capturing and positions at an equal distance preceding and following the position, focus evaluation values are found from the video signals obtained from the imaging devices for focus state detection, and a comparison is made between the focus evaluation values in the greater-than, equal-to, less-than relation, whereby the focus state on the light reception face of the usual imaging device for image formation is detected. An imaging device for focus state detection is not placed at a conjugate position relative to an imaging device for image formation and is disposed only at two positions at an equal distance preceding and following the position, so that the focus state can also be detected. The method of detecting the focus state of the imaging lens using a plurality of imaging devices has the advantage that the reaction rate to focusing is also high because not only whether or not the state is an in-focus state can be determined, but also whether the focus state is ahead or behind the in-focus position can be determined.

By the way, some zoom lenses for a broadcast camera, etc., contain a relay lens system into which an extender optical system can be inserted. JP-A-2002-365517 and JP-A-2003-270517 propose each a system of inserting a light split unit into a relay lens system in a imaging lens for splitting subject light and introducing the split subject light for focus state detection into each imaging device for focus state detection. On the other hand, JP-A-2002-296492 and JP-A-2003-248164 propose each a system of splitting subject light behind a imaging lens rather than splitting a light flux in a imaging lens and introducing the subject light for focus state detection. This is an adapter system placed detachably between the imaging lens and the camera main body and can be attached to already existing general imaging lenses as an autofocus adapter.

However, in the system using the relay lens system in the imaging lens as described in JP-A-2002-365517 and JP-A-2003-270517, if the optical system for focus state detection is incorporated, it becomes impossible to use an extender optical system. It cannot be applied to an imaging lens including no relay lens system; this is a problem. On the other hand, each of the systems described in JP-A-2002-296492 and JP-A-2003-248164 is an adapter system placed detachably between the imaging lens and the camera main body and can be attached to already existing general imaging lenses. In JP-A-2003-248164, however, the adapter optical system contains the relay optical system and an image is once formed in the adapter optical system and then the image formation light is captured in the imaging device of the camera main body by the relay optical system as a relay system. Thus, the overall length at the attachment time becomes long and the system lacks compactness. JP-A-2002-296492 does not describe a specific lens configuration in the adapter optical system. Therefore, development of specific lenses suited to the adapter optical system is demanded.

SUMMARY OF THE INVENTION

An object of an illustrative, non-limiting embodiment of the invention is to provide an autofocus adapter that can be attached to already existing general imaging lenses and can be implemented in a compact size and at low cost.

According to an aspect of the invention, there is provided an autofocus adapter being placed detachably between a imaging lens and a camera main body for detecting the focus state of the imaging lens and performing autofocus control of the imaging lens, the autofocus adapter including a imaging adapter optical system (a first optical system) placed on an optical axis of the imaging lens (a first optical axis) when the autofocus adapter is attached, a focus state detection adapter optical system (a second optical system) placed on an optical axis (a second optical system) different from the optical axis of the imaging lens when the autofocus adapter is attached, and a focus state detection imaging device on which focus state detection subject light (first subject light) is made incident through the focus state detection adapter optical system. The imaging adapter optical system has a light split unit (a first split unit) being placed on the optical axis of the imaging lens when the autofocus adapter is attached for splitting subject light passing through the imaging lens into subject light for image formation (second subject light) and the focus state detection subject light; a first lens group having negative power as a whole and placed on the side of an object with respect to the light split unit; and a second lens group having positive power as a whole and placed on the side of an image with respect to the light split unit.

The autofocus adapter according to an aspect of the invention may further include an focus state detection unit for detecting the focus state of the imaging lens based on an image captured by the focus state detection adapter optical system; and a control unit for performing autofocus control of the imaging lens based on the focus state detected by the focus state detection unit.

It is made possible to attach the autofocus adapter according to an aspect of the invention to already existing general imaging lenses because the adapter system placed detachably between the imaging lens and the camera main body is adopted. Thus, the autofocus adapter can also be attached to the imaging lens using the extender optical system and it is also made possible to use an extender at the same time. A relay optical system is not used as the imaging adapter optical system, so that an increase in the overall length at the attachment time is suppressed and it is advantageous for ensuring compactness and reducing the cost. The focus state detection subject light split through the light split unit is made incident on the focus state detection side adapter optical system placed on the optical axis different from the optical axis of the imaging lens, so that it is advantageous for compaction.

In the autofocus adapter according to an aspect of the invention, preferably the light split unit of the imaging adapter optical system satisfies the following conditional expression. Accordingly, the light flux for focus state detection is appropriately provided without shading the light flux at the light split unit.

$$1.0 < d/2h \quad (1)$$

where d is the thickness of the light split unit in the optical axis direction and h is the maximum height from the optical axis of the light flux passing through the light split unit.

In the autofocus adapter according to an aspect the invention, preferably the first lens group of the imaging adapter optical system contains at least a first cemented lens made up of a negative lens and a positive lens, the second lens group contains at least a positive lens and a second cemented lens made up of a positive lens and a negative lens, and the imaging adapter optical system satisfies the following conditional expression. Accordingly, degradation of the optical performance caused by inserting the adapter optical system is suppressed.

$$-0.8 < f1/f2 < -0.7 \quad (2)$$

where f1 is the focal length of the first lens group and f2 is the focal length of the second lens group.

In the autofocus adapter according to an aspect of the invention, for example, the light split unit of the imaging adapter optical system can be a light split prism having right-angle prisms cemented on their slopes and the light split face of the light split prism can be placed at an angle of approximately 45° with respect to the optical axis of the imaging adapter optical system for emitting the focus state detection subject light in a bend direction of approximately 90° with respect to the optical axis. The right-angle prisms are thus used appropriately, so that it is advantageous for compaction.

In the autofocus adapter according to an aspect of the invention, preferably the focus state detection adapter optical system is placed on the emission side of the focus state detection subject light relative to the light split unit and has a positive lens group having the same lens configuration as in the second lens group of the imaging adapter optical system. The positive lens group has the same lens configuration as the second lens group, so that it is advantageous for reducing the cost.

In this case, the focus state detection adapter optical system may further have a right-angle prism for bending approximately 90° the optical path of the focus state detection subject light split through the light split unit and passing through the positive lens group. The focus state detection adapter optical system may further have a focus state detection split unit (a second light split unit) being placed on the optical path bent by the right-angle prism for splitting the focus state detection subject light into parts, and the focus state detection imaging device may be placed on each of the optical paths provided by the focus state detection split unit. Accordingly, it becomes further advantageous for compaction.

BRIEF DESCRIPTION OF THE DRAWINGS

The features of the invention will appear more fully upon consideration of the exemplary embodiment of the invention, which are schematically set forth in the drawings, in which:

FIG. 7 is a drawing to show one example of the lens data of an imaging lens;

FIG. 8 is a drawing to show the lens data of an adapter optical system according to example 1 in an autofocus adapter according to an exemplary embodiment of the invention;

FIG. 9 is a drawing to show the lens data of an adapter optical system according to example 2 in an autofocus adapter according to an exemplary embodiment of the invention;

FIG. 10 is a drawing to show the lens data of an adapter optical system according to example 3 in an autofocus adapter according to an exemplary embodiment of the invention;

FIG. 11 is a drawing to show the lens data of an adapter optical system according to example 4 in an autofocus adapter according to an exemplary embodiment of the invention; and FIG. 12 is a drawing to show the values concerning conditional expressions collectively about the examples.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment, an autofocus adapter adopts the adapter system placed detachably between the imaging lens and the camera main body and further adopts the lens configuration in which a relay optical system is not used as the imaging adapter optical system, and the light flux split through the light split unit is made incident on the focus state detection side adapter optical system placed on the optical axis different from the optical axis of the imaging lens and is used as the focus state detection subject light, so that the autofocus adapter can be attached to already existing general imaging lenses and can be implemented in a compact size and at low cost.

Referring now to the accompanying drawings, there is shown exemplary embodiments of the invention.

Figure 1:
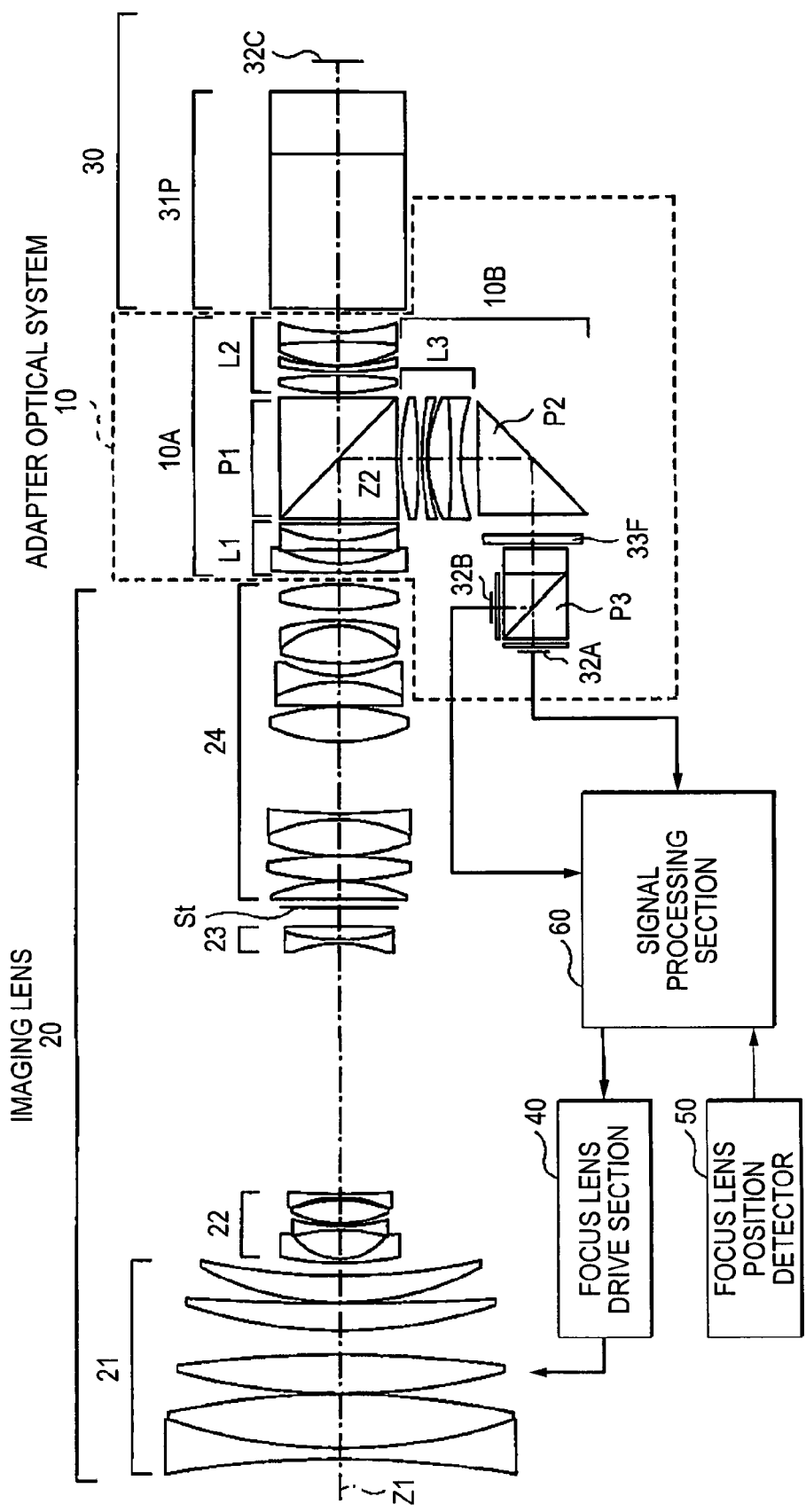
FIG. 1 is a drawing to show a configuration of a camera system incorporating an autofocus adapter according to an exemplary embodiment of the invention.

FIG. 1 shows a system configuration example wherein an autofocus adapter according to one embodiment of the invention is built in a TV camera system. This TV camera system includes an imaging lens 20 and a camera main body 30. The autofocus adapter according to the embodiment is placed detachably between the imaging lens 20 and the camera main body 30 and has a function of detecting the focus state of the imaging lens 20 and performing autofocus control of the imaging lens 20. A photographer can attach the autofocus adapter as desired and if the autofocus function is not required in the TV camera system, the imaging lens 20 can be attached directly to the camera main body 30 for use; only if the autofocus function is required, the autofocus adapter can be placed between the imaging lens 20 and the camera main body 30. The autofocus adapter has an adapter optical system 10 and a processing circuit for processing an image for focus state detection provided through the adapter optical system 10 and implementing the autofocus control function.

The imaging lens 20 includes a lens side mount at the rear end and is attached to the camera main body 30 as the lens side mount is attached to a camera side mount provided on the front end face of the camera main body 30. The autofocus adapter includes a rear mount of the same structure as the lens side mount at the rear end and can be attached to the camera main body 30 as the rear mount is attached to the camera side mount of the camera main body 30. Likewise, the autofocus adapter includes a front mount of the same structure as the camera side mount at the front end and the imaging lens 20 can be attached to the autofocus adapter as the lens side mount of the imaging lens 20 is attached to the front mount.

The camera main body 30 has an imaging device 32C for image formation and a camera main body side optical system provided nearer to the object side than the imaging device 32C for image formation. The camera main body side optical system contains a color separation prism 31P for separating imaging subject light incident on the camera main body 30 into three colors of red light, green light, and blue light, for example. In this case, the imaging devices 32C for image formation are provided in a one-to-one correspondence with the colors. FIG. 1 illustrates the color separation prism 31P expanded equivalently on an optical axis Z1 of the imaging lens 20 and shows only one imaging device 32C for image formation.

The imaging lens 20 is implemented as a zoom lens, for example. The imaging lens 20 includes a first lens group 21, a second lens group 22, a third lens group 23, an aperture diaphragm St, and a fourth lens group 24 in order from the object side, for example. In the imaging lens 20, for example, the first lens group 21 is a focus group, the second lens group 22 and the third lens group 23 are variable power groups, and the fourth lens group 24 is a relay lens group. An extender optical system can also be inserted into the relay lens group of the fourth lens group 24. Subject light incident from the tip of the imaging lens 20 passes through the lenses and is emitted from the rear end of the imaging lens 20. When the autofocus adapter is attached, emission light from the imaging lens 20 is incident on the adapter optical system 10. When the autofocus adapter is not attached, emission light from the imaging lens 20 is incident on the camera main body 30. The embodiment is characterized particularly by the configuration of the adapter optical system 10 in the autofocus adapter; the configuration of the imaging lens 20 is not limited.

The autofocus adapter has a pair of focus state detection imaging devices 32A and 32B, a focus lens drive section 40, a focus lens position detector 50, and a signal processing section 60 in addition to the adapter optical system 10.

The adapter optical system 10 includes an imaging adapter optical system 10A placed on the optical axis Z1 of the imaging lens 20 at the attachment time and a focus state detection adapter optical system 10B placed on an optical axis Z2 different from the optical axis Z1 of the imaging lens 20 at the attachment time. The pair of focus state detection imaging devices 32A and 32B is provided at the image formation position of the focus state detection adapter optical system 10B.

Figure 5:
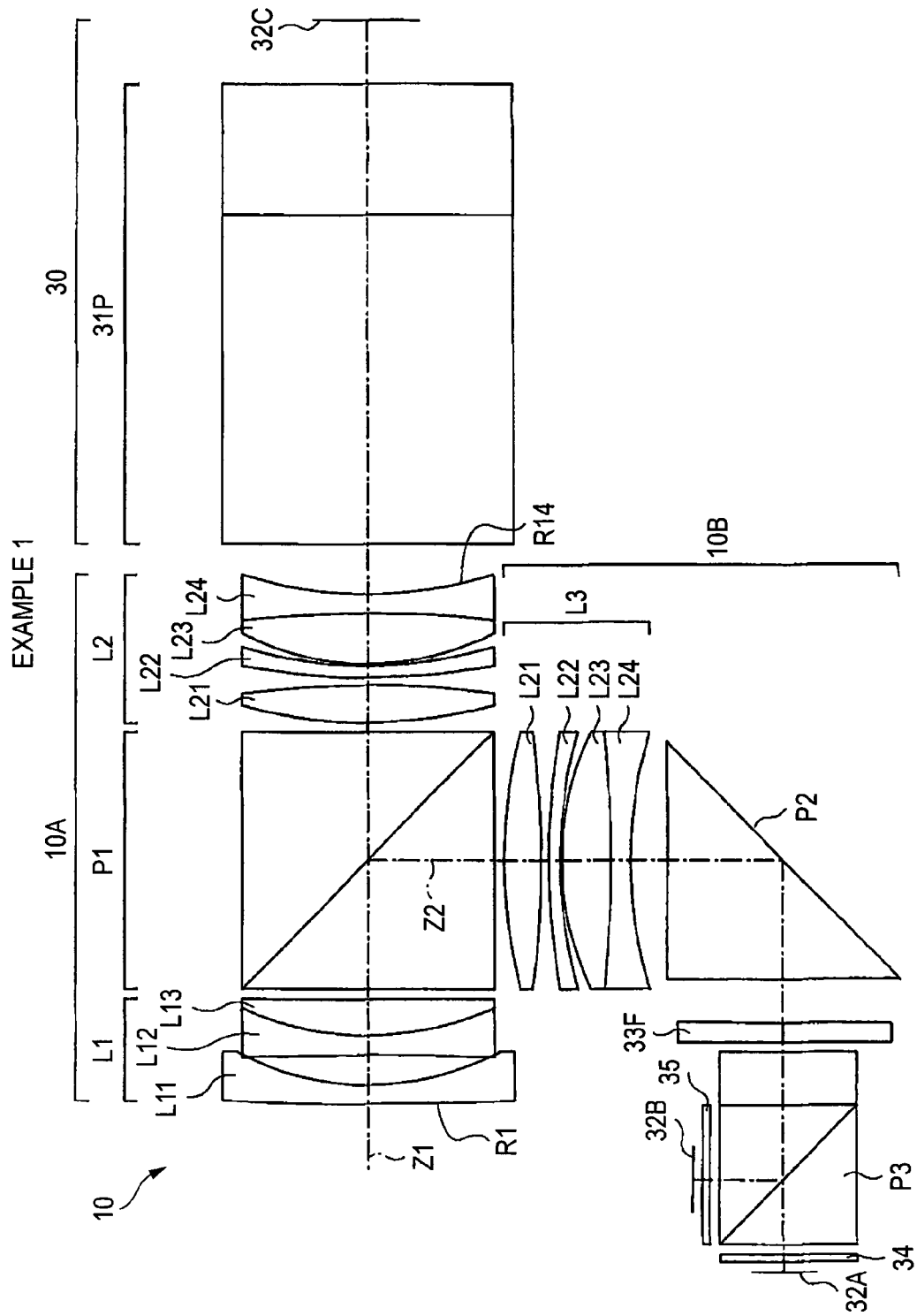
FIG. 5 is an optical system sectional view to show a first configuration example of an adapter optical system in the autofocus adapter according to an exemplary embodiment of the invention.
Figure 6:
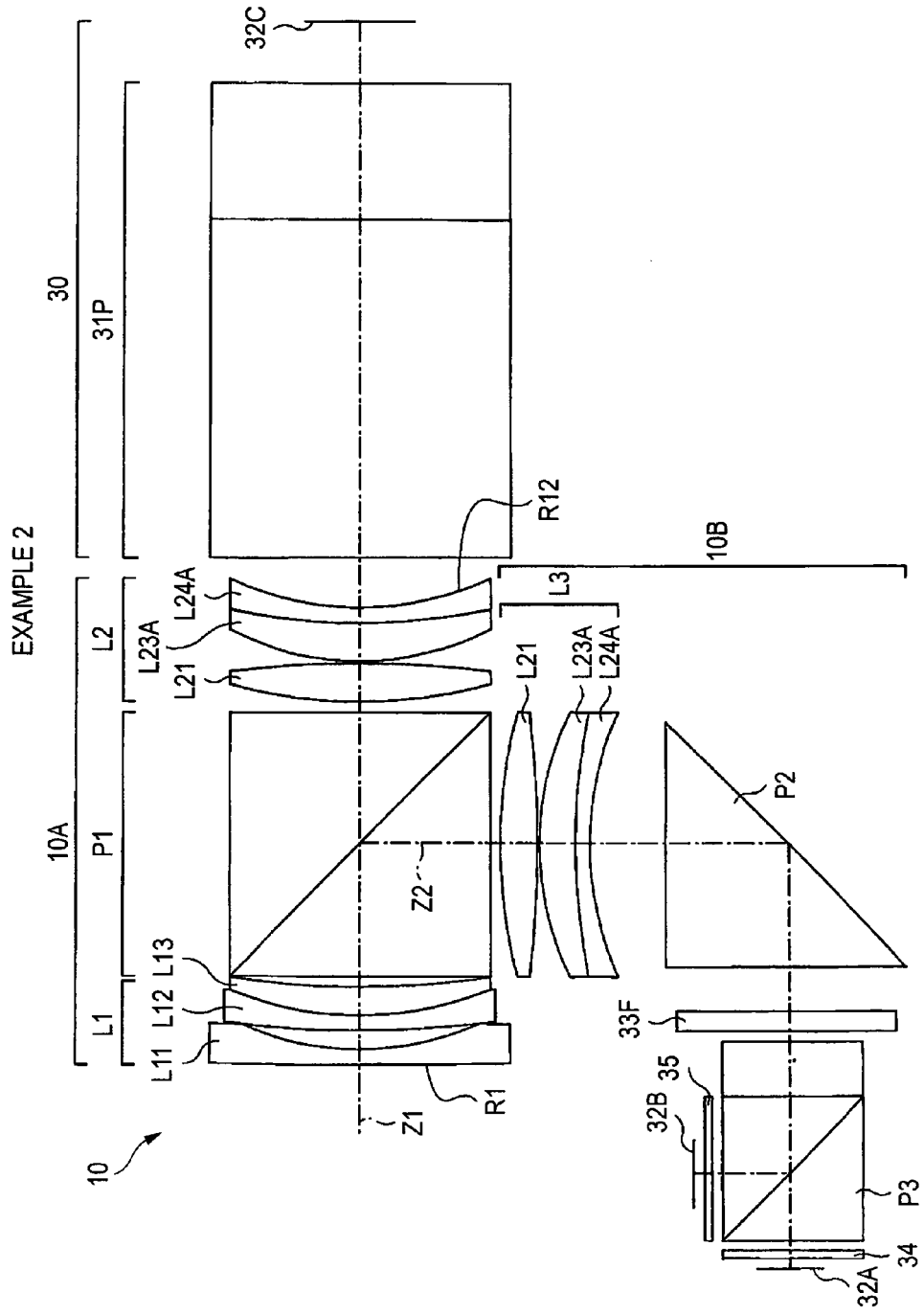
FIG. 6 is an optical system sectional view to show a second configuration example of an adapter optical system in an autofocus adapter according to an exemplary embodiment of the invention.

FIG. 5 shows a first configuration example of the adapter optical system 10. This configuration example corresponds to the lens configuration of a first numeric example described later with reference to FIG. 8. FIG. 6 shows a second configuration example. This configuration example corresponds to the lens configuration of a second numeric example described later with reference to FIG. 9. The imaging adapter optical system 10A is placed on the optical axis Z1 of the imaging lens 20 at the attachment time and has a light split prism P1 as light split unit for splitting subject light passing through the imaging lens 20 into imaging subject light (transmitted light) and focus state detection subject light (reflected light), a first lens group L1 having negative power as a whole and placed on the object side with respect to the light split prism P1, and a second lens group L2 having positive power as a whole and placed on the image side with respect to the light split prism P1.

The light split prism P1 is provided by cementing two right-angle prisms on their slopes and has a light split face placed at an angle of approximately 45° with respect to the optical axis Z1 of the photographing adapter optical system 10A for emitting focus state detection subject light in a bend direction of approximately 90 degrees with respect to the optical axis Z1.

Preferably, the light split prism P1 satisfies the following conditional expression wherein d is the thickness of the light split prism P1 in the optical axis Z1 direction and h is the maximum height from the optical axis Z1 of a light flux passing through the light split prism P1:

$$1.0 < d/2h \tag{1}$$

As conditional expression (1) is satisfied, the light flux for focus state detection is appropriately split in the bend direction of approximately 90 degrees with respect to the optical axis Z1 without shading the light flux at the light split prism P1.

Preferably, the first lens group L1 contains at least a first cemented lens made up of a negative lens and a positive lens. In the configuration examples in FIGS. 5 and 6, the first lens group L1 is made up of one negative lens L11 and a first cemented lens made up of a negative lens L12 and a positive lens L13 in order from the object side. The negative lens L11 is a negative meniscus lens with a concave face directed to the image side.

Preferably, the second lens group L2 contains at least one positive lens and a second cemented lens made up of a negative lens and a positive lens. In the first configuration example in FIG. 5, the second lens group L2 is made up of one biconvex positive lens L21, one negative lens L22 having a negative meniscus shape with a concave face directed to the image side, and a second cemented lens made up of a biconvex positive lens L23 and a biconcave negative lens L24 in order from the object side. In the second configuration example in FIG. 6, the second lens group L2 is made up of one biconvex positive lens L21 and a second cemented lens made up of a positive lens L23A having a positive meniscus shape with a convex face directed to the object side and a negative lens L24A having a negative meniscus shape with a concave face directed to the image side in order from the object side.

Preferably, the first lens group L1 and the second lens group L2 satisfy the following conditional expression wherein f1 is the focal length of the first lens group L1 and f2 is the focal length of the second lens group L2:

$$-0.8 < f1/f2 < -0.7 \tag{2}$$

As conditional expression (2) is satisfied, degradation of the optical performance caused by inserting the adapter optical system 10 is suppressed. Particularly, the image formation magnifying power of the adapter optical system 10 becomes a value in an appropriate range. If the value falls below the lower limit, it is not preferable because the emission pupil position of the whole optical system with the adapter optical system 10 inserted becomes near to the image formation surface, causing color shading to occur. If the upper limit is exceeded, the image formation magnifying power of the adapter optical system 10 exceeds 1.4 times, the focal length of the whole optical system becomes 1.4 times the focal length of the imaging lens 20 into which the adapter optical system 10 is inserted, and the original effect of angle of view of the imaging lens 20 is not provided.

The focus state detection adapter optical system 10B has a positive lens group L3. This positive lens group L3 is placed on the emission side of focus state detection subject light relative to the light split prism P1 and has the same lens configuration as the second lens group L2 in the imaging adapter optical system 1A. The positive lens group L3 and the second lens group L2 in the photographing adapter optical system 10A are placed at optically mutually conjugate positions with the light split prism P1 between. The positive lens group L3 thus has the same lens configuration as the second lens group L2, whereby it is advantageous for reducing the cost.

The focus state detection adapter optical system 10B further has a right-angle prism P2, a filter 33F, and a light split prism P3 in the traveling order of the focus state detection subject light. The right-angle prism P2 is placed behind the positive lens group L3 for bending the optical path of the focus state detection subject light passing through the positive lens group L3 approximately 90° to the side of the imaging lens 20. The filter 33F and the light split prism P3 are placed on the optical path bent through the right-angle prism P2. The light split prism P3 is provided as focus state detection split means. It is provided by cementing two right-angle prisms on their slopes, for example, for splitting the focus state detection subject light into two parts in different directions. One focus state detection imaging device 32A is provided on one optical path split through the light split prism P3, and the other focus state detection imaging device 32B is provided on the other optical path. Cover glass 34 is provided between the light split prism P3 and the one focus state detection imaging device 32A. Cover glass 35 is provided between the light split prism P3 and the other focus state detection imaging device 32B. The right-angle prism P2 is thus provided in the focus state detection adapter optical system 10B for further bending the optical path, whereby the configuration becomes advantageous for compaction.

Figure 2:
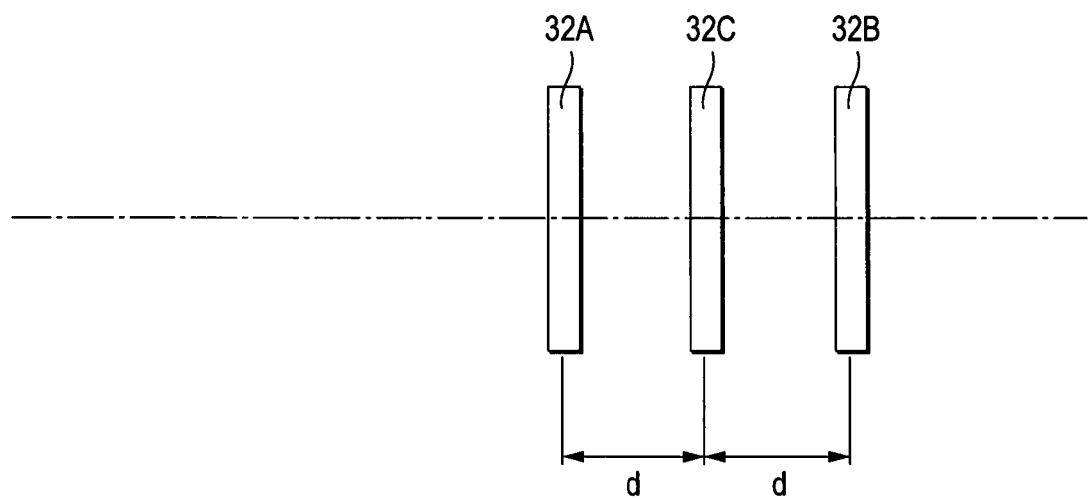
FIG. 2 is a schematic representation to equivalently show the positional relationship between an imaging device for image formation and imaging devices for focus state detection on the same optical axis.

FIG. 2 shows the optical axis of subject light incident on the photographing imaging device 32C of the camera main body 30 and the optical axis of subject light incident on the pair of focus state detection imaging devices 32A and 32B on the same line. As shown in FIG. 2, the optical path length of the subject light incident on one focus state detection imaging device 32A is set shorter by 2 d than the optical path length of the subject light incident on the other focus state detection imaging device 32B, and the optical path length of the subject light incident on the image pickup surface of the imaging device 32C for image formation is set to the midpoint length therebetween. That is, the pair of focus state detection imaging devices 32A and 32B is placed at the positions at an equal distance from the imaging surface (focus surface) of the imaging device 32C for image formation with the imaging surface therebetween.

Thus, the pair of focus state detection imaging devices 32A and 32B capture a subject image at the positions at the equal distance from the imaging surface (focus surface) of the imaging device 32C with the imaging surface therebetween. The pair of focus state detection imaging devices 32A and 32B need not be imaging devices for capturing a color image and in the embodiment, is CCDs (Charge Couple Devices), CMOSs (Complementary Metal Oxide Semiconductors), etc., for capturing a monochrome image.

Figure 3:
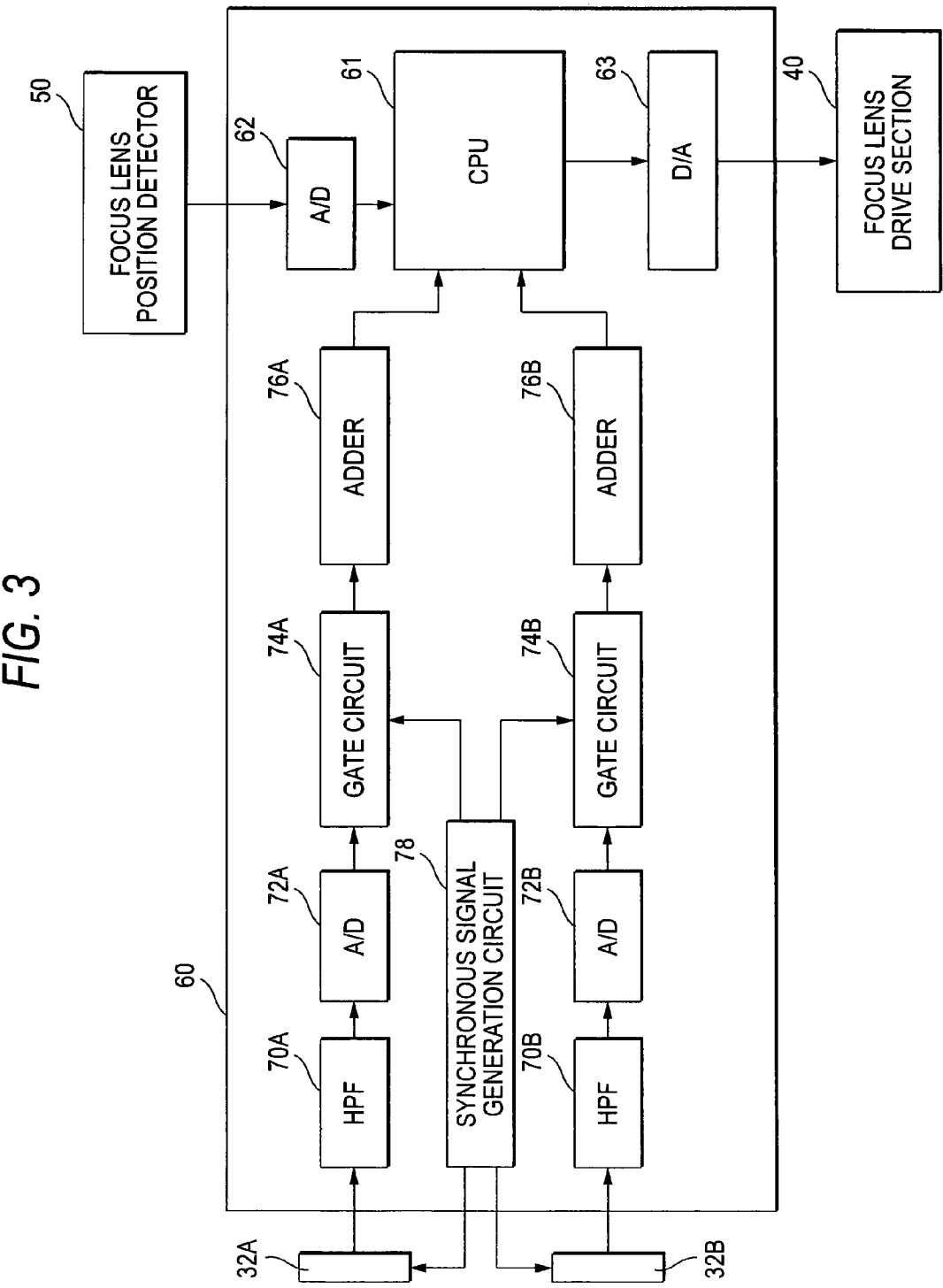
FIG. 3 is a block diagram to show a configuration of a signal processing section in an autofocus adapter according to an exemplary embodiment of the invention.

FIG. 3 shows a specific configuration example of the signal processing section 60. Imaging signals from the pair of focus state detection imaging devices 32A and 32B are input to the signal processing section 60. The signal processing section 60 detects the focus state of the imaging lens 20 based on the imaging signals acquired from the focus state detection imaging devices 32A and 32B as described later. It outputs a control signal to the focus lens drive section 40 based on the detected focus state for performing autofocus control of the focus of the imaging lens 20 as described later.

In the embodiment, the focus state detection imaging devices 32A and 32B and the signal processing section 60 correspond to one specific example of "the focus state detection unit" in the invention. The focus lens drive section 40, the focus lens position detector 50, and the signal processing section 60 correspond to one specific example of "the control unit" in the invention.

The signal processing section 60 has high-pass filters (HPFs) 70A and 70B, A/D (analog-digital) converters 72A and 72B, gate circuits 74A and 74B, and adders 76A and 76B as circuitry for performing a signal processing for the imaging signals acquired from the focus state detection imaging devices 32A and 32B, as shown in FIG. 3. The signal processing section 60 also has a synchronous signal generation circuit 78 and a CPU 61. It also has an A/D converter 62 for converting a detection signal from the focus lens position detector 50 from analog form into digital form and outputting the digital signal to the CPU 61 and a D/A converter 63 for converting a control signal from the CPU 61 to the focus lens drive section 40 from digital form into analog form.

The focus lens drive section 40 has a focus motor for moving the focus lens group in the imaging lens 20 and a focus motor drive circuit for driving the focus motor.

Next, the function and the operation of the described camera system will be discussed.

The subject light incident from the front end of the imaging lens 20 passes through the lenses in the imaging lens 20 and is emitted from the rear end of the imaging lens 20. When the autofocus adapter is attached, the emission light from the imaging lens 20 is made incident on the adapter optical system 10. When no autofocus adapter is attached, the emission light from the imaging lens 20 is made incident on the camera main body 30. The video subject light incident on the camera main body 30 is separated into color components of red light, green light, and blue light, for example, through the color separation prism 31P. The color components into which the subject light is separated are made incident on the light reception surfaces of the imaging devices 32C provided in a one-to-one correspondence with the colors and are converted into electric signals in the imaging devices 32C and then are subjected to signal processing by an image signal processing unit (not shown) and are output or are recorded on a record medium as a video signal in a format.

The subject light incident on the adapter optical system 10 passes through the first lens group L1 and is incident on the light split prism P1. The subject light is split into imaging subject light (transmitted light) and focus state detection subject light (reflected light) through the light split prism P1. The imaging subject light passes through the second lens group L2 and is incident on the camera main body 30. The focus state detection subject light is emitted in the bend direction of approximately 90 degrees with respect to the optical axis Z1 through the light split prism P1 and is incident on the positive lens group L3 of the focus state detection adapter optical system 10B. The optical path of the focus state detection subject light passing through the positive lens group L3 is bent through the right-angle prism P2 approximately 90° to the side of the imaging lens 20. The light split prism P3 is placed ahead of the optical path bent through the right-angle prism P2 for further splitting the focus state detection subject light into two parts. One split focus state detection subject light is incident on one focus state detection imaging device 32A, and the other split focus state detection subject light is incident on the other focus state detection imaging device 32B. The pair of focus state detection imaging devices 32A and 32B outputs imaging signals responsive to the incident focus state detection subject light.

The imaging signals from the pair of focus state detection imaging devices 32A and 32B are output to the signal processing section 60. The signal processing section 60 detects the focus state of the imaging lens 20 based on the imaging signals acquired from the focus state detection imaging devices 32A and 32B as described later. It outputs a control signal to the focus lens drive section 40 based on the detected focus state for performing autofocus control of the focus of the imaging lens 20 as described later.

On the other hand, the signal processing section 60 inputs the position data of the focus lens from the focus lens position detector 50 into the CPU 61 through the A/D converter 62, as shown in FIG. 3. The CPU 61 calculates the traveling speed of the focus lens based on the acquired position data of the focus lens and outputs a control signal of the focus motor through the D/A converter 63 to a focus motor drive circuit in the focus lens drive section 40.

The subject images captured by the focus state detection imaging devices 32A and 32B are output as video signals in a format and are converted into signals of focus evaluation values indicating the image sharpness (image contrast) by the high-pass filters 70A and 70B, the A/D converters 72A and 72B, the gate circuits 74A and 74B, and the adders 76A and 76B, and the signals are input to the CPU 61, as shown in FIG. 3.

Processing to finding of the focus evaluation value will be discussed. Since the focus state detection imaging devices 32A and 32B in the embodiment are CCDs for imaging a monochrome image, the video signals output from the focus state detection imaging devices 32A and 32B are luminance signals indicating the luminance of each of the pixels making up one screen (one field). The video signals are input to the high-pass filters 70A and 70B for extracting high-frequency components of the signals.

The signals of the high-frequency components extracted through the high-pass filters 70A and 70B are converted into digital signals by the A/D converters 72A and 72B. Only the digital signals corresponding to the pixels in a focus area (for example, the screen center) of the digital signals of one screen (one field) of each of the images captured by the focus state detection imaging devices 32A and 32B are extracted by the gate circuits 74A and 74B, and the values of the digital signals in the extraction ranges are added by the adders 76A and 76B. Accordingly, the total sum of the values of the high-frequency components of the video signals in the focus area is found. The values provided by the adders 76A and 76B are the focus evaluation values indicating the degree of the sharpness of the image in the focus area.

From the synchronous signal generation circuit 78 shown in FIG. 3, various synchronous signals are fed into the circuits of the focus state detection imaging devices 32A and 32B, the gate circuits 74A and 74B, etc., for synchronizing the circuits with each other for processing. From the synchronous signal generation circuit 78, a vertical synchronous signal (V signal) for each field of video signal is fed into the CPU 61.

The CPU 61 detects the current focus state of the imaging lens 20 relative to the imaging surface (focus surface) of the video imaging device based on the focus evaluation values obtained from the focus state detection imaging devices 32A and 32B as described above.

Figure 4:
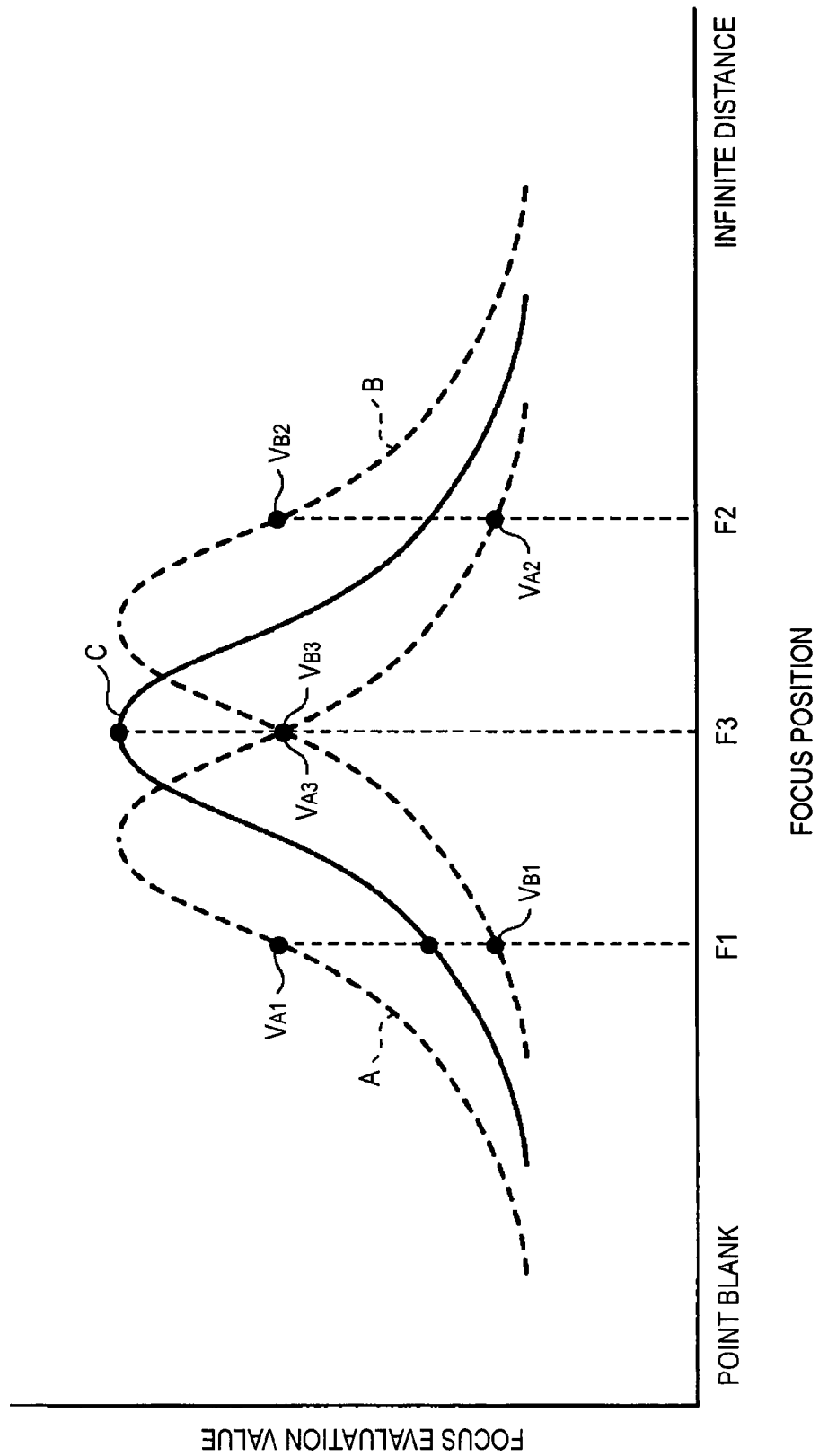
FIG. 4 is a schematic representation to show the principle of focus state detection in an autofocus adapter according to an exemplary embodiment of the invention.

FIG. 4 shows the focus evaluation values for the focus position when one subject is captured with the focus position of the imaging lens 20 taken on the horizontal axis and the focus evaluation values on the vertical axis. In the figure, a curve C indicated by the solid line indicates the focus evaluation values obtained from the imaging device 32C for the focus position, and curves A and B indicated by the dotted lines in the figure indicate the focus evaluation values obtained from the focus state detection imaging devices 32A and 32B for the focus position. In FIG. 4, a position F3 where the focus evaluation value of the focus evaluation values of the curve C becomes the maximum is the in-focus position.

If the focus position of the imaging lens 20 is set to F1, focus evaluation value $V_{A1}$ obtained from one focus state detection imaging device 32A becomes the value corresponding to the position F1 of the curve A, and focus evaluation value $V_{B1}$ obtained from the other focus state detection imaging device 32B becomes the value corresponding to the position F1 of the curve B. The focus evaluation value $V_{A1}$ obtained from one focus state detection imaging device 32A becomes larger than the focus evaluation value $V_{B1}$ obtained from the other focus state detection imaging device 32B and thus it is seen that the focus position is set to the point-blank side rather than the in-focus position (F3), namely, the state is an anterior focal point.

On the other hand, if the focus position of the imaging lens 20 is set to F2, focus evaluation value $V_{A2}$ obtained from one focus state detection imaging device 32A becomes the value corresponding to the position F2 of the curve A, and focus evaluation value $V_{B2}$ obtained from the other focus state detection imaging device 32B becomes the value corresponding to the position F2 of the curve B. The focus evaluation value $V_{A2}$ obtained from one focus state detection imaging device 32A becomes smaller than the focus evaluation value $V_{B2}$ obtained from the other focus state detection imaging device 32B and thus it is seen that the focus position is set to the infinite distance side rather than the in-focus position (F3), namely, the state is a posterior focal point.

In contrast, if the focus position of the imaging lens 20 is set to F3, namely, the in-focus position, focus evaluation value $V_{A3}$ obtained from one focus state detection imaging device 32A becomes the value corresponding to the position F3 of the curve A, and focus evaluation value $V_{B3}$ obtained from the other focus state detection imaging device 32B becomes the value corresponding to the position F3 of the curve B. At this time, the focus evaluation value $V_{A3}$ obtained from one focus state detection imaging device 32A and the focus evaluation value $V_{B3}$ obtained from the other focus state detection imaging device 32B become equal and thus it is seen that the focus position is set to the in-focus position (F3).

Thus, which of an anterior focal point, a posterior focal point, and in-focus the focus state at the current focus position of the imaging lens 20 is can be detected based on the focus evaluation values $V_A$ and $V_B$ obtained from the focus state detection imaging devices 32A and 32B.

As described above, it is made possible to attach the autofocus adapter according to the embodiment to already existing general imaging lenses because the adapter system placed detachably between the imaging lens 20 and the camera main body 30 is adopted. Thus, the autofocus adapter can also be attached to the imaging lens 20 using the extender optical system and it is also made possible to use an extender at the same time. A relay optical system is not used as the imaging adapter optical system 10A, so that an increase in the overall length at the attachment time is suppressed and it is advantageous for ensuring compactness and reducing the cost. The light flux split through the light split unit (light split prism P1) is made incident on the focus state detection side adapter optical system placed on the optical axis Z2 different from the optical axis Z1 of the imaging lens 20 and is used as the focus state detection subject light, so that it is advantageous for compaction. The positive lens group L3 having the same lens configuration as the second lens group L2 in the imaging adapter optical system 10A is used for the focus state detection adapter optical system 10B, so that it is advantageous for reducing the cost. Thus, the autofocus adapter that can be attached to already existing general imaging lenses and can be provided in a compact size and at low cost can be implemented.

EXAMPLES

Next, specific numeric examples of the adapter optical system 10 in the autofocus adapter according to the embodiment will be discussed. The numeric examples of the imaging adapter optical system 10A of the adapter optical system 10 are shown below; in the embodiment, the focus state detection adapter optical system 10B has the positive lens group L3 having the same lens configuration as the second lens group L2 in the imaging adapter optical system 10A and therefore is substantially similar to the photographing adapter optical system 10A. First to fourth numeric examples of the imaging adapter optical system 10A will be discussed below together. Numeric examples of the imaging lens 20 will also be discussed below.

FIG. 7 shows specific lens data corresponding to the configuration of the imaging lens 20 shown in FIG. 1. FIG. 8 shows specific lens data corresponding to the configuration of the imaging adapter optical system 10A shown in FIGS. 1 and 5 as example 1. The column of surface number Si in the lens data shown in FIGS. 7 and 8 indicates the number of the ith surface with the symbol given so as to increase in order toward the image side wherein the surface of the component nearest to the object side is the first. The column of curvature radius Ri indicates the value (mm) of the curvature radius of the ith surface from the object side. Likewise, the column of spacing Di also indicates the spacing (mm) on the optical axis between the ith surface Si and the "i+1"st surface Si+1 from the object side. The column of Ndj indicates the value of the refractive index of the jth optical element from the object side at the d-line (wavelength 587.6 nm). The column of vdj indicates the value of the Abbe number of the jth optical element from the object side at the d-line (wavelength 587.6 nm).

Like the imaging adapter optical system 10A according to example 1, FIG. 9 shows specific lens data corresponding to the configuration of the imaging adapter optical system 10A shown in FIG. 6 as example 2. Likewise, FIG. 10 shows lens data of the imaging adapter optical system 10A according to example 3, and FIG. 11 shows lens data of the imaging adapter optical system 10A according to example 4. The lens cross sections of the imaging adapter optical system 10A according to examples 3 and 4 are similar to the configuration of the imaging adapter optical system 10A shown in FIG. 6 and therefore are not shown.

FIG. 12 shows the values concerning the conditional expressions described above collectively for the examples. It also shows the values of image formation magnifying power β of the photographing adapter optical system 10A. As seen in FIG. 12, the values in the examples are within the numeric ranges in the conditional expressions.

As seen from the numeric data shown above, a compact optical system can be implemented for each example.

It is to be understood that the invention is not limited to the specific embodiment or examples thereof and various modifications may be made. For example, the values of the curvature radius, the spacing, the refractive index, and the like of each lens component are not limited to the values shown in the numeric examples and can take any other value.

In the description of the embodiment, the two focus state detection imaging devices 32A and 32B are included, but the invention can also be applied to the case where three focus state detection imaging devices are included. In this case, the focus state detection adapter optical system 10B may include means for splitting focus state detection subject light into three parts in place of the means for splitting focus state detection subject light into two parts (light split prism P3) and the split parts of the subject light may be made incident on the three focus state detection imaging devices.

While the invention has been described with reference to the exemplary embodiments, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

This application claims foreign priority from Japanese Patent Application No. 2006-94539, filed Mar. 30, 2006, the entire disclosure of which is herein incorporated by reference.

What is claimed is:

1. An autofocus adapter being placed detachably between an imaging lens and a camera main body and detecting a focus state of the imaging lens and performing autofocus control of the imaging lens, the autofocus adapter comprising:

a first optical system placed on a first optical axis of the imaging lens;

a second optical system placed on a second optical axis different from the first optical axis; and an imaging device receiving first subject light for detecting the focus state of the imaging lens, through the second optical system, wherein the first optical system comprising:

a first light split unit being placed on the first optical axis and splitting subject light, which is passed through the imaging lens, into the first subject light and second subject light for image formation;

a first lens group having a negative power and placed on an object side with respect to the first light split unit; and a second lens group having a positive power and placed on an image side with respect to the first light split unit, wherein the first lens group comprises a first cemented lens comprising a negative lens and a positive lens, and the second lens group comprises a positive lens and a second cemented lens, the second cemented lens comprising a positive lens and a negative lens, wherein the first optical system satisfies Conditional Expression:

$$1.0 < d/2h \tag{1}$$

wherein d is a thickness of the first light split unit along the first optical axis, and h is a maximum height from the first optical axis of a light flux passing through the first light split unit.

2. The autofocus adapter according to claim 1 wherein the first optical system satisfies Conditional Expression:

$$-0.8 < f1/f2 < -0.7 \qquad (2)$$

wherein f1 is a focal length of the first lens group, and f2 is a focal length of the second lens group.

3. The autofocus adapter according to claim 2, wherein the first light split unit comprises right-angle prisms cemented on slopes thereof, and wherein the first light split unit has a light split face placed at an angle of approximately 45° with respect to the first optical axis and emits the first subject light in a bend direction of approximately 90° with respect to the first optical axis.

4. The autofocus adapter according to claim 3, wherein the second optical system is placed on an emission side of the first subject light relative to the first light split unit, and wherein the second optical system comprises a positive lens group having the same lens configuration as in the second lens group of the first optical system.

5. The autofocus adapter according to claim 4, wherein the second optical system further comprises a right-angle prism that bends approximately 90° an optical path of the first subject light passed through the positive lens group.

6. The autofocus adapter according to claim 5, wherein the second optical system further comprises a second light split unit placed on the optical path bent by the right-angle prism and splitting the optical path of the first subject light into a plurality of optical paths, and wherein the imaging device is placed on each of the plurality of optical paths.

7. An autofocus adapter being placed detachably between an imaging lens and a camera main body and detecting a focus state of the imaging lens and performing autofocus control of the imaging lens, the autofocus adapter comprising:

a first optical system placed on a first optical axis of the imaging lens;

a second optical system placed on a second optical axis different from the first optical axis; and an imaging device receiving first subject light for detecting the focus state of the imaging lens, through the second optical system, wherein the first optical system comprising:

a first light split unit being placed on the first optical axis and splitting subject light, which is passed through the imaging lens, into the first subject light and second subject light for image formation;

a first lens group having a negative power and placed on an object side with respect to the first light split unit; and a second lens group having a positive power and placed on an image side with respect to the first light split unit, wherein the first lens group comprises a first cemented lens comprising a negative lens and a positive lens, and the second lens group comprises a positive lens and a second cemented lens, the second cemented lens comprising a positive lens and a negative lens, wherein the first optical system satisfies Conditional Expression:

$$-0.8 < f1/f2 < -0.7 \qquad (2)$$

wherein f1 is a focal length of the first lens group, and f2 is a focal length of the second lens group.

8. The autofocus adapter according to claim 7 wherein the second optical system is placed on an emission side of the first subject light relative to the first light split unit, and wherein the second optical system comprises a positive lens group having the same lens configuration as in the second lens group of the first optical system.

* * * * *